Patented June 7, 1938

2,119,976

UNITED STATES PATENT OFFICE 2,119,976

METHOD OF FORMING RESINOUS HYDRO-CARBON POLYMERS

Ivan V. Wilson, Dayton, Ohio, assignor, by mesne assignments, to Monsanto Chemical Company, a corporation of Delaware No Drawing. Application April 12, 1935, Serial No. 16,035

13 Claims. (Cl. 260—2)

This invention relates to resins of petroleum origin and it deals particularly with a process of reacting and polymerizing unsaturated cracked petroleum hydrocarbons to obtain light colored resinous products superior to those heretofore produced.

One of the principal objects of this invention is to provide synthetic resins of properties superior, especially in color, to those heretofore produced.

Another object of this invention is to provide a method of producing superior light colored synthetic resins by somewhat simpler and more easily controlled procedures.

Still another object of this invention is to provide a method of polymerization of unsaturated hydrocarbons, with metallic halides hydrolyzable by water, to obtain light colored polymers.

Other objects and advantages of this invention will be apparent from the following description and appended claims.

Reference is herein made to the patent of Charles A. Thomas and Carroll A. Hochwalt, No. 1,836,629, of December 15, 1931; patent of Charles A. Thomas, No. 1,947,626, of August 12, 1933; patent of Charles A. Thomas, No. 1,939,932, of December 19, 1933; patent of Charles A. Thomas, No. 1,982,707, of December 4, 1934; patent of Charles A. Thomas and William H. Carmody, No. 1,982,708, of December 4, 1934; which disclose resins produced by reactions and polymerizations of unsaturated hydrocarbons of various degrees of unsaturation in the presence of metallic halide catalysts hydrolyzable by water, such as aluminum chloride, ferric chloride, ferric bromide, etc. Such general reactions include:

(1) Combination of olefines with diolefines.
(2) Combination of aromatic hydrocarbon with olefines and/or diolefines.
(3) Combination of alkylated aromatic hydrocarbons with olefines and/or diolefines.
(4) Combination of terpenes with olefines and/or diolefines.

In these reactions either cyclic and/or open chain olefines and diolefines may be used and the reactions are generally accompanied or followed by polymerization.

In general, the method of producing the resinous products, as described in the patents mentioned, consists in agitating while polymerizing a suitable hydrocarbon mixture (which has been preliminary dried) with approximately 3% by weight of anhydrous metallic halide for a period of about 4 hours. After the reaction is completed, the anhydrous metallic halide is removed, for example, by adding a quantity of ammonia in solution in alcohol sufficient to convert the metallic halide to metallic hydroxide and ammonium halide and filtering out these insoluble salts. From the resulting filtrate, containing the resin in solution, the unreacted hydrocarbons can be recovered by distillation, leaving the resin as a solid.

It has now been found that the properties of the resins made by the disclosed process can be improved considerably by modifications of the described procedures. The resins themselves are improved in color and often are of higher melting point, hardness and similar properties which enhance their commercial value. The improvements realized in this improved process for manufacturing these products include:

(1) The time required for reaction is materially shortened;
(2) The resins produced are more uniform in properties;
(3) Reaction is more easily controlled; and,
(4) A preliminary drying by agitation with a drying agent and subsequent filtration is obviated.

Heretofore efforts have been made to improve the color of the resin by means of decolorizing agents, applied to the discolored product. My invention is calculated to form the resin under conditions which eliminate or minimize the formation of color imparting compositions. It has been found that darkening of the resins produced is largely a result of the presence in the resin of hydrogen chloride or hydrochloric acid, which results on hydrolysis of the metallic halides or the partially hydrolyzed metallic halide complex. In the improved process, use is made of various substances which prevent the formation of hydrogen chloride or hydrochloric acid, or react with them as formed, or adsorb the material which is prejudicial to good color in the final product. This is accomplished by adding to the mixture to be polymerized a material which takes up any traces of moisture that would otherwise tend to hydrolyze the aluminum chloride and induce liberation of free HCl. A large number of materials are suitable for this purpose, which are inert with respect to the desired polymerization reaction yet effective for the purposes desired.

In one method of practicing this invention the hydrocarbon mixture is reacted in the presence of the metallic halide together with a so-called "physical" drying or absorbing agent in situ. By "physical" drying or absorbing agent is to be understood a substance which takes up water and other substances, for example, hydrogen chloride, without any chemical reaction apparently occurring. Such substances include dry carbon black, adsorptive or activated charcoals, silica gel, and various clays such as fuller's earth and Attapulgus clay. The hydrocarbon mixture after reaction is then treated in the usual way, that is, the metallic halide is removed, the resin solution is filtered from the solids present and then evaporated until only the resin remains. The resin may be treated further according to this invention with superheated steam, to remove oily impurities.

In another method of practicing this invention the hydrocarbon mixture is reacted in the presence of the metallic halide together with a so-called "chemical" drying agent in situ. By "chemical" drying agent is to be understood a substance which takes up water, either by forming a so-called hydrate or new compound, or else by taking it up to form a hydrated molecule, that is, the water is taken up by the substance as water of crystallization. "Chemical" drying agents which are satisfactory in this process include alkaline earth oxides as for example calcium oxide, anhydrous calcium sulfate, barium oxide, magnesium perchlorate and the like. Some of these substances also take up hydrogen chloride and hydrochloric acid. The hydrocarbon mixture after reaction is then treated as in the preceding process. However, if an alkaline reagent such as calcium oxide is used, the following method is preferred: The metallic halide is precipitated as before with alcoholic ammonia solution. The mixture is then boiled to remove the major portion of the ammonia formed, by reaction of the ammonium halide thus formed with the alkaline reagent. The mixture is subsequently filtered from the residual alkali drying agent, aluminum hydrate, calcium and ammonium halide and other solids and the resin is recovered and purified in the manner described previously.

In still another method of practicing this invention, the hydrocarbon mixture is reacted in the presence of the metallic halide together in situ with a substance which reacts with hydrogen chloride or hydrochloric acid. Such substances include sodium carbonate, potassium carbonate, calcium carbonate and di-sodium phosphate. Some substances of this class act as drying agents also. The resin is recovered as before.

Representative examples of each of these procedures follow:

A highly cracked distillate rich in diolefines, having the following distillation characteristics, was used: 57% at 100° C.; 89% at 95°/50 mm.; 100% at 125°/50 mm. To 1000 cc. of this condensate were added 15 grams of Norit carbon black. The mixture was agitated and then 15 grams of anhydrous aluminum chloride were added in small portions. After agitating for 1 hour, 60 cc. of an alcoholic ammonia solution prepared by mixing 60 parts by volume of 95% alcohol and 40 parts by volume of ammonium hydroxide of specific gravity 0.90 were added. The mixture was filtered and then evaporated until hard, brittle resin remained. The resin had a color of 3 on the Barrett standards and its yield corresponds to 1.39 pounds per gallon of condensate. Resin made from the same condensate without the addition of carbon black during the initial reaction and without the subsequent treatment with steam had a color of 9 on the Barrett scale, and its melting point was 18° C. lower than that made by the improved process.

This latter resin was dissolved in petroleum naphtha and there was added thereunto a weight of Norit carbon black equal to the weight of resin contained in the solution. The mixture was then heated to boiling, filtered and the filtrate was subsequently evaporated until hard, brittle resin remained. The resin had a color corresponding to 7 on the Barrett scale. Although this indicates that the carbon black effects some decolorization after the resin is formed, the result is not as pronounced as that which accrues from the use of the carbon black in the presence of aluminum chloride. This indicates that the carbon black added during the initial reaction has an effect evidently similar to that of the other dehydrating or absorbing agents described hereafter.

A highly cracked distillate having the following distillation characteristics was used: initial boiling point 21° C.; 10% at 27° C.; 20% at 77° C.; 30% at 84° C.; 40% at 109° C.; 50% at 138° C.; 60% at 160° C.; 60% to 100% at 160° C. to about 230° C. To 1000 cc. of this condensate were added 15 grams of anhydrous aluminum chloride and 40 grams of anhydrous calcium oxide. The mixture was agitated for one hour and then 60 cc. of the alcoholic ammonia solution previously prepared were added. The mixture was evaporated to about one-half its original volume to remove ammonia and water and was then filtered. The filtrate was evaporated until hard, brittle resin remained. The resin was further treated with steam for one hour in a vacuum of about 20 to 25 inches at a temperature of 220° C. to 240° C. The yield of hard, brittle resin was 2.13 pounds per gallon of condensate and its color was 3.5 on the Barrett scale. Its melting point was 128° C. and its varnish characteristics were good. Resin made from the same distillate without the addition of calcium oxide and without the subsequent treatment with steam, had a color corresponding to 7.5 on the Barrett scale, and its melting point was 101° C. The treatment with steam was found to be without influence on the color but did increase the melting point of the resin by removing volatile residual oily products in the resin.

A highly cracked distillate having the following distillation characteristics was used: 10% at 24° C.; 20% at 65° C.; 30% at 79° C.; 40% at 106° C.; 50% at 135° C.; 60% at 158° C.; 60% to 100% at 158° C. to about 230° C. To 1000 cc. of this condensate were added 15 grams of anhydrous aluminum chloride and 20 grams of anhydrous sodium carbonate. The mixture was agitated for one hour, 60 cc. of the alcoholic ammonia solution were then added as before, and the mixture was then evaporated to about one-half its volume. The mixture was then filtered and evaporated to hard, brittle resin. The resin was subsequently further treated with steam for one hour in a vacuum of 20 to 25 inches at a temperature of 220° C. to 240° C. The resin yield corresponded to 1.82 pounds per gallon of condensate and had a color of 4 on the Barrett scale. Resin made from the same condensate without the addition of sodium carbonate had a color corresponding to 8 on the Barrett scale.

In the foregoing examples, alcoholic ammonia was used to decompose and remove the aluminum halide. While this method is preferred, it is to be understood that other methods of removing the halide may be employed.

Although the quantities used in the above mentioned examples constitute preferred embodiments of the invention, it is to be understood that the invention is not limited to these specific materials or quantities thereof and that other variations may be made without departing from this invention.

What I claim is:

1. In the manufacture of hydrocarbon resinous polymers according to which an unsaturated hydrocarbon mixture rich in diolefines is polymerized in the presence of a metallic halide polymerizing catalyst, after which the catalyst is decomposed and removed as inert products and the resin is recovered by evaporation, the improvement whereby a resinous polymer of improved color and other varnish forming characteristics is obtained, characterized in that the polymerization is effected in the presence of a material inert with respect to the reactants and capable of removing HCl from the zone of reaction during the polymerization.

2. In the manufacture of hydrocarbon resinous polymers according to which a highly cracked petroleum distillate rich in diolefines is polymerized in the presence of a metallic halide polymerizing catalyst, after which the catalyst is decomposed and removed as inert products and the resin is recovered by evaporation, the improvement whereby a resinous polymer of improved color and other varnish forming characteristics is obtained, characterized in that the polymerization is effected in the presence of a material which is hygroscopic, inert with respect to the reactants and capable of removing HCl from the zone of reaction during the polymerization.

3. The method as defined in claim 1 and further characterized in that the material added is capable of combining chemically with water.

4. The method as defined in claim 1 and further characterized in that the material is a hygroscopic inorganic compound of an alkaline earth metal.

5. The method as defined in claim 1 and further characterized in that the material is calcium oxide.

6. The method as defined in claim 1 and further characterized in that the material is anhydrous calcium sulfate.

7. The modification of the method as defined in claim 1 characterized in that the material is added after the polymerization but before the reacted mixture is treated to remove and neutralize the catalyst.

8. In the manufacture of hydrocarbon resinous polymers according to which an unsaturated hydrocarbon mixture rich in diolefines is polymerized in the presence of a metallic halide polymerizing catalyst, after which the catalyst is decomposed and removed as inert products and the resin is recovered by evaporation, the improvement whereby a resinous polymer of improved color and other varnish forming characteristics is obtained, characterized in that the polymerization is effected in the presence of a material inert with respect to the reactants and capable of removing any moisture in the zone of reaction.

9. In the manufacture of hydrocarbon resinous polymers according to which an unsaturated hydrocarbon mixture rich in diolefines is polymerized in the presence of a metallic halide polymerizing catalyst, after which the resulting polymerized reaction mixture is neutralized with an alcoholic base whereby the metallic halide catalyst is decomposed and rendered inert, and the resin is recovered by filtration and subsequent evaporation of the resulting filtrate, the improvement whereby a resin of improved color and other varnish forming characteristics is obtained, characterized in that the polymerization is effected in the presence of a material inert with respect to the reactants and capable of removing HCl from the zone of reaction during the polymerization.

10. In the manufacture of hydrocarbon resinous polymers according to which an unsaturated hydrocarbon mixture rich in diolefines is polymerized in the presence of a metallic halide polymerizing catalyst, after which the resulting polymerized reaction mixture is neutralized with an alcoholic base whereby the metallic halide catalyst is decomposed and rendered inert and the resin is recovered by filtration and subsequent evaporation of the resulting filtrate, the improvement whereby a resin of improved color and other varnish forming characteristics is obtained, characterized in that the polymerization is effected in the presence of a material inert with respect to the reactants and capable of combining with water.

11. The method as defined in claim 9 and further characterized in that the material added is a hygroscopic inorganic compound of an alkaline earth metal.

12. The method as defined in claim 9 and further characterized in that the material is calcium oxide.

13. The method as defined in claim 10 and further characterized in that the material is anhydrous calcium sulfate.

IVAN V. WILSON.